(12) United States Patent
Greene et al.

(10) Patent No.: US 6,431,019 B1
(45) Date of Patent: Aug. 13, 2002

(54) LOW COST, HIGH-STRENGTH ROBOTIC ARM

(75) Inventors: Michael L. Greene, Fort Washington; Samuel J. DeVane, Nanjemoy; Jacob Tallman, Indian Head, all of MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/814,483

(22) Filed: Mar. 21, 2001

(51) Int. Cl.[7] ................................................ B25J 17/00
(52) U.S. Cl. .................. 74/490.05; 89/1.1; 267/70; 901/28; 588/202
(58) Field of Search .................. 74/490.05, 490.01, 74/490.03, 490.06, 490.08; 901/28, 29, 1, 27, 35, 49; 294/137; 604/95; 403/229, 291; 267/69–74; 89/1.13, 1.1, 1.11

(56) References Cited

U.S. PATENT DOCUMENTS

| | | | | |
|---|---|---|---|---|
| 4,300,362 A | * | 11/1981 | Lande et al. | |
| 4,393,728 A | * | 7/1983 | Larson et al. | ................. 74/469 |
| 4,621,562 A | * | 11/1986 | Carr et al. | |
| 4,739,241 A | * | 4/1988 | Vachtsevanos | |
| 4,741,642 A | * | 5/1988 | Carlton | ........................ 901/29 |
| 4,815,911 A | * | 3/1989 | Bengtsson et al. | ............. 414/7 |
| 4,919,034 A | * | 4/1990 | Firth | ........................... 89/1.13 |
| 5,116,190 A | * | 5/1992 | Silke | ............................ 901/29 |
| 5,451,134 A | * | 9/1995 | Bryfogle | ................. 74/490.08 |
| 5,585,707 A | * | 12/1996 | Thompson et al. | |
| 5,624,398 A | * | 4/1997 | Smith et al. | ................... 901/35 |
| 5,647,723 A | * | 7/1997 | Rush | ............................ 901/29 |
| 5,833,656 A | * | 11/1998 | Smith et al. | ................... 901/35 |
| 5,836,083 A | * | 11/1998 | Sangwan | ....................... 901/45 |
| 5,979,290 A | * | 11/1999 | Simeone | ..................... 89/1.13 |
| 6,232,519 B1 | * | 5/2001 | Eidelman et al. | ........... 588/202 |

* cited by examiner

Primary Examiner—Douglas C. Butler
(74) Attorney, Agent, or Firm—Mark Homer

(57) ABSTRACT

The present invention is a robotic arm with a plurality of telescoping tubes coupled rotatably to a plurality of rings through apertures in the rings. A plurality of tendons pass through the telescoping tubes. Tension is applied to the plurality of tendons to move the telescoping tubes. A controller is employed to direct the amount of tension applied whereby the robotic arm moves as directed.

12 Claims, 2 Drawing Sheets

LOW COST, HIGH-STRENGTH ROBOTIC ARM

STATEMENT OF GOVERNMENT INTEREST

The invention described herein may be manufactured and used by or for the Government of the United States of America for governmental purposes without payment of any royalties thereon or therefore.

BACKGROUND OF THE INVENTION

1. Field of the Invention

The present invention pertains to the field of robotic arms. More particularly the invention is concerned with robotic arms with a high strength to weight ratio suitable for explosive ordnance disposal.

2. Brief Description of the Prior Art

Tele-operated platforms, such as robotic arms or units, are being introduced into the field for use to access and neutralize an area containing unexploded ordnance. This is due to the high safety risk of personnel entering such areas and conducting procedures to render safe unexploded ordnance by hand. However, current commercial and developmental robotic arms are often prohibitively expensive or do not have the flexibility and strength to weight ratio necessary for the procedures described above. Typically, such robotic arms or mechanisms include a wheeled or tracked platform which carry the operational components or attachments adapted for dealing with the particular ordnance within an area. Commercially available robots are designed to lift a payload at the end of an elongated arm and due to design considerations, often can only lift payloads of one or two pounds. This is sometimes insufficient to render safe unexploded ordnance. All of the commercially available robots are extremely expensive, and, therefore, impractical to use in situations where they might be destroyed while completing missions. Due to the limitations of currently available robots, there is need for small flexible robotic arm with high strength to weight ratios so that it could be used in tight spaces for rendering safe unexploded ordnance.

SUMMARY OF THE INVENTION

The present invention comprises a robotic arm of tubular construction that is designed to maximize the moment of inertia generated through the center of its circular cross section. The invention is also designed to minimize cost so it may be used under hazardous conditions where the invention might be damaged.

In general, the robotic arm of the present invention comprises a plurality of rings having a plurality of apertures. A plurality telescoping tubes coupled rotatably to the plurality of rings through the plurality of apertures. A plurality of tendons pass through the plurality of telescoping tubes. Some means for applying tension to the plurality of tendons is employed. Finally, some means is employed for controlling telescoping of the plurality of telescoping tubes whereby the robotic arm moves from tension applied by the tendons and the tension application means. Because the tension on the robotic arm of this invention is applied to the outside of the arm, this provides the greatest lifting capacity for the invention.

Accordingly, it is an object of this invention to provide a robotic arm that maximizes lifting capacity.

It is a further object of this invention to provide a low-cost robotic arm.

This invention accomplishes these objectives and other needs related to low-cost, high-capacity robotic arms.

BRIEF DESCRIPTION OF THE DRAWINGS

The accompanying drawings, which are incorporated in and constitute a part of the specification, illustrate embodiments of the invention, and, together with the description, serve to explain the principles of the invention.

DESCRIPTION OF THE PREFERRED EMBODIMENT

The present invention is a robotic arm of tubular construction that is designed to maximize the moment of inertia generated through the center of its circular cross section. Deflection of a cantilevered beam of length l and moment of inertia I with a load increasing uniformly to the fixed end is proportional to $l^3/I$, and for a uniformly distributed load, $l^4/I$. Because the moment of inertia is proportional to the $4^{th}$ power of the diameter of the arm, to give a robotic arm its maximum lifting capacity while minimizing deflection, a good design may place the control and support structure nearest the outside diameter of the arm. The present invention is also designed to minimize cost due to the potential for damage to the invention in its hazardous mission. The invention is designed in order to use extremely low cost materials that will be described more fully below.

To accomplish the above, the present robotic arm comprises a plurality of telescoping tubes that are coupled to a plurality of rings through apertures on the rings. A plurality of tendons passes through the telescoping tubes; and, some means for applying tension to the plurality of tendons is employed. Finally, some means for controlling telescoping of the plurality of telescoping tubes is used whereby the robotic arm moves from tension applied by the tendons and the tension application means. In this configuration, the robotic arm movement is controlled by the tension on the tendons, which are placed near the outside diameter of the arm, thereby maximizing lifting capacity of the arm and decreasing deflection.

Figure 1:
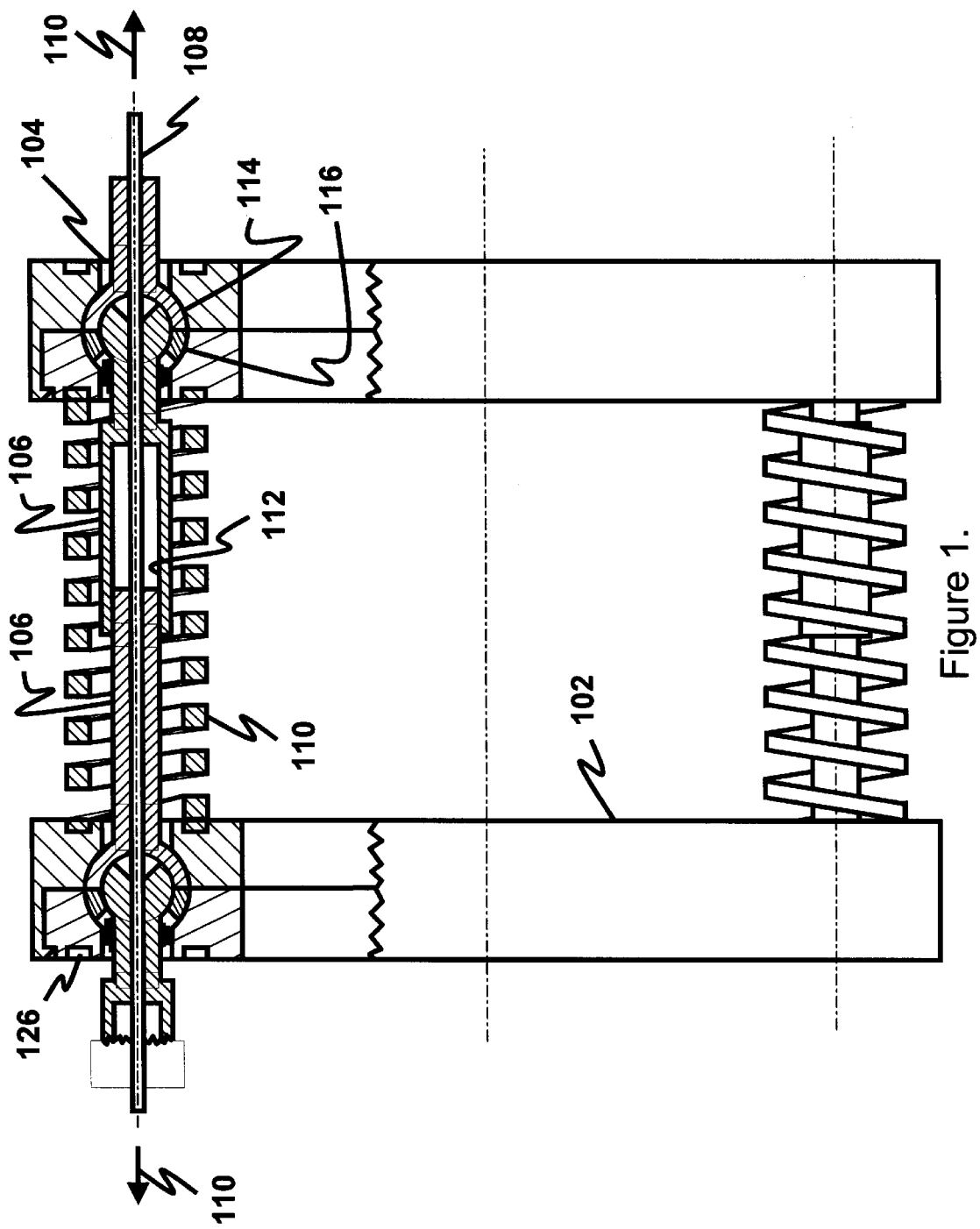
FIG. 1 is an enlarged cross-sectional side view of an embodiment of the invention showing two rings.

Referring to FIG. 1, a robotic arm comprising a plurality of rings 102 having a plurality of apertures 104 is coupled rotatably to a plurality of telescoping tubes 106 through the plurality of apertures 104. This configuration provides the physical structure of the robotic arm. A plurality of tendons 108 passes through the plurality of telescoping tubes 106. Some means for applying tension 110 to the plurality of tendons is employed. Some means for controlling telescoping 112 of the plurality of telescoping tubes 106 whereby the robotic arm moves from tension applied by the tendons 108 and the tension application means 110.

The number and diameter of the plurality of rings 102 determine the size of the robotic arm and are dependent upon the particular lifting capacity and length required for the mission of the arm. The required size is determinable by one skilled in the art. The plurality of rings 102 may be comprised of virtually any material, however, materials such as plastic are preferred due to their light weight and low cost. In one embodiment of the invention, the two flat faces of each ring 102 may have meshing teeth to engage any other adjacent ring 102, depending upon its angular position, at one or more points. While a circular or oval shape of the plurality of rings 102 is preferable, numerous shapes may be employed and may be selected by one skilled in the art by determining the relationship between the moment of inertia and length of the arm as discussed above.

The plurality of apertures 104 must be large enough to accommodate the plurality of telescoping tubes 106, but must not be large enough to potentially interfere with the tension application means 110 as discussed more fully below. The plurality of telescoping tubes 106 are preferably constructed of plastic or composite material for the same reasons discussed above for the plurality of rings 102. The number of telescoping tubes 106 used in the present invention is determinable by one skilled in the art, but preferably, at least three telescoping tubes 106 are used. Increasing the number of telescoping tubes 106 will also increase the lifting capacity and maneuverability of the arm, but will also increase the complexity and cost. The plurality of telescoping tubes 106 are coupled rotatably, through the plurality of apertures 104, to the plurality of rings 102. This rotatable coupling is preferably accomplished by using simple ball and socket joints 114 placed within retaining rings 116 comprised within the plurality of apertures 104. In one embodiment of the invention, the retaining rings 116 are split, similar to a lock washer, for ease in assembly.

The plurality of tendons 108 may be made of any type of material normally used in a cable like application. One preferred material is nylon due to its strength and low cost. In one embodiment of the invention, the plurality of tendons 108 may comprise an outer skin of conducting polymer that may conduct electrical signals to the telescoping controller means 112. There are also numerous embodiments of tension application means 110 that may be employed in the present invention. The tension application means 110 normally will be some type of flexible mechanical system that wants to pull the plurality often dons 108 back to their original shape. Examples of tension application means 110 include rubber and compressed springs. The embodiment of the invention shown in FIG. 1 comprises a compressed spring 110 coiled concentrically around the plurality of telescoping tubes 106. The compressed spring 110 is held in this concentric position by trepans 126 formed on the surfaces of the plurality of rings 102 which are concentric (larger) to the plurality of apertures 104. In this configuration, the compressed spring 110 is held in its compressed state by the tendon 108. The robotic arm movement is dependent upon the telescoping controller means 112, discussed further below, which provides changing resistance to the plurality of tendons 108 and creates movement similar to that of a marionette. When the telescoping controller means 112 lock the plurality of telescoping tubes 106 in position, the tendons 110 may be adjusted sinusoidally in tension to cause damping of any vibration modes of the cantilevered robotic arm.

Figure 2:
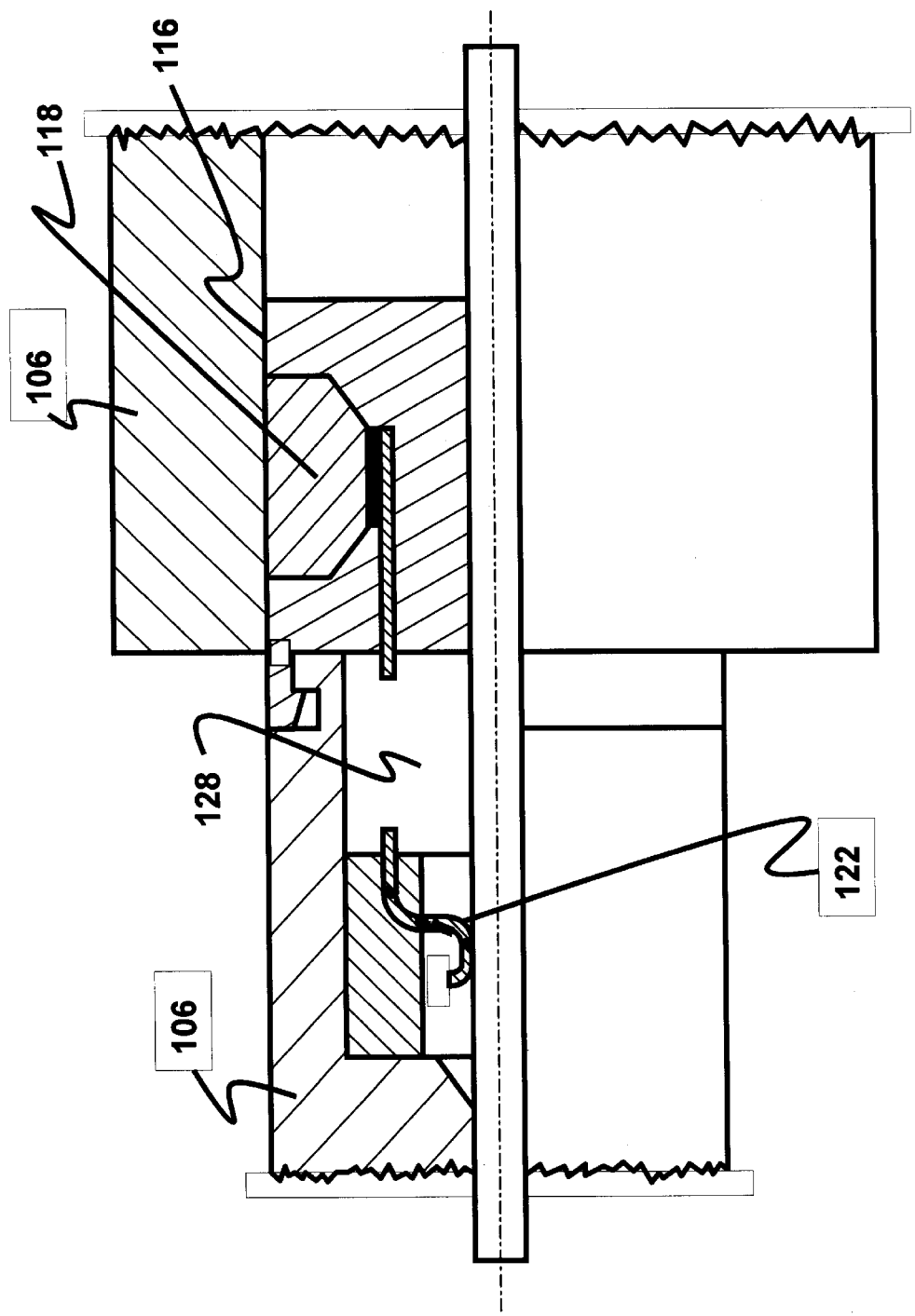
FIG. 2 is a cross-sectional side view of one embodiment of the controller means of the invention.

Many telescoping controller means 112 may be employed in the present invention and are determinable by one skilled in the art. The telescoping controller means 112 must merely be able to apply force to the plurality of tendons 108 and can comprise electrical, mechanical, chemical, pneumatic, or a combination of any of these systems. Two preferred telescoping controller means 112 are the use of microelectrical mechanical systems (MEMS) and/or the use of artificial muscle technologies such as electro-active materials. One embodiment of the use of such telescoping controller means 112 is set forth in FIG. 2. FIG. 2 shows an enlargement of a telescoping tube 106. Here, the interfacing cylindrical surfaces 116 of the telescoping tubes 106 utilize MEMS 118 and/or artificial muscle 118 controllers incorporated therein and thereon to cause the cylindrical surfaces 116 to bind together when the controllers are actuated. Surface changes that are controlled by the MEMS 118 and/or artificial muscle 118 controllers produce mechanical interference between the cylindrical surfaces 116. The MEMS 118 and/or artificial muscle controllers 118 act on the telescoping tubes 106 to control the robotic arm as the action of a brake pedal in an automotive vehicle may control its speed.

In one embodiment, using artificial muscle 118 controllers, a high friction material would be applied to the inner surface of the telescoping tubes 106. The artificial muscle controller 118 would be in contact with the high friction conductive material. When voltage and/or current is applied to the artificial muscle controller 118, it will undergo a change in shape due to eletrical, electro-chemical, capacitive, electro-active, and/or piezoelectric properties of the artificial muscle controller with a resulting locking of the telescoping tubes 106 in place.

In an embodiment using either MEMS controllers 118 and artificial muscle controllers 118, a copper brush 122 would conduct electrical energy to the electronic decoder 128 housed within a cavity in the telescoping tubes 106. The electronic decoder 128 can use many types of different control mechanisms such as multiplexing, specific control frequencies, or digital means to determine when and where to supply power to the artificial muscle 118.

The present invention also includes a method of rendering safe unexploded ordnance, comprising the steps of providing a robotic arm as described above, positioning the robotic arm near the unexploded ordnance, and, initiating the robotic arm.

What is described are specific examples of many possible variations on the same invention and are not intended in a limiting sense. The claimed invention can be practiced using other variations not specifically described above.

What is claimed is:

1. A robotic arm, comprising:
   a plurality of rings having a plurality of apertures;
   a plurality of telescoping tubes coupled rotatably to the plurality of rings through the plurality of apertures;
   a plurality of tendons passing through the plurality of telescoping tubes;
   means for applying tension to the plurality of tendons; and, means for controlling telescoping of the plurality of telescoping tubes whereby the robotic arm moves from tension applied by the plurality of tendons and the tension application means.

2. The robotic arm of claim 1, wherein the plurality telescoping tubes are coupled rotatably to the plurality of rings by a plurality of ball and socket joints.

3. The robotic arm of claim 2, wherein the tension application means comprises a compressed spring coiled concentrically around the plurality of telescoping tubes.

4. The robotic arm of claim 3, wherein the plurality of tendons comprise a nylon material.

5. The robotic arm of claim 4, wherein the plurality of telescoping tubes comprises a material selected from plastic, composite, or non-metallic.

6. The robotic arm of claim 5, wherein the plurality of rings comprise a material selected from plastic, composite, or non-metallic.

7. The robotic arm of claim 6, wherein the plurality of telescoping tubes comprises at least three telescoping tubes.

8. The robotic arm of claim 1, wherein the telescoping controller means can lock the plurality of telescoping tubes in place.

9. The robotic arm of claim 1, wherein the telescoping controller means comprises a plurality of microelectrical mechanical structures.

10. The robotic arm of claim 9, wherein the plurality of microelectrical mechanical structures receive an electrical signal that results in deformation of the structures causing the plurality of telescoping tubes to lock in place.

11. The robotic arm of claim 9, wherein the telescoping controller means comprises an electro-active material that receives an electrical signal that results in deformation of the material causing the plurality of telescoping tubes to lock in place.

12. A method of rendering safe unexploded ordnance, comprising the steps of:

provicing a robotic arm comprising a plurality of rings having a plurality of apertures coupled rotatably by a plurality of ball and socket joints to a plurality of telescoping tubes through the plurality of apertures, a plurality of tendons passing through the plurality of apertures, a compressed spring coiled concentrically around the plurality of telescoping tubes, and, means for controlling telescoping of the plurality of telescoping tubes whereby the robotic arm moves based upon tension applied by the plurality of tendons and the compressed spring;

positioning the robotic arm near the unexploded ordnance; and, initiating the robotic arm.

\* \* \* \* \*